United States Patent
Memmott et al.

(10) Patent No.: US 12,243,657 B2
(45) Date of Patent: Mar. 4, 2025

(54) EMERGENCY HEAT REMOVAL IN A LIGHT WATER NUCLEAR REACTOR BY USING A PASSIVE ENDOTHERMIC REACTION COOLING SYSTEM

(71) Applicants: Matthew J. Memmott, Provo, UT (US); Joel Riding Johnson, Cranberry Township, PA (US)

(72) Inventors: Matthew J. Memmott, Provo, UT (US); Joel Riding Johnson, Cranberry Township, PA (US)

( * ) Notice: Subject to any disclaimer, the term of this patent is extended or adjusted under 35 U.S.C. 154(b) by 450 days.

(21) Appl. No.: 17/543,335

(22) Filed: Dec. 6, 2021

(65) Prior Publication Data

US 2022/0254528 A1   Aug. 11, 2022

Related U.S. Application Data

(63) Continuation-in-part of application No. 16/162,815, filed on Oct. 17, 2018, now abandoned, which is a continuation of application No. PCT/US2017/028345, filed on Apr. 19, 2017.

(60) Provisional application No. 62/324,715, filed on Apr. 19, 2016.

(51) Int. Cl.
 *G21C 15/18* (2006.01)
 *F28D 20/00* (2006.01)
 *G21C 15/26* (2006.01)
 *G21C 15/28* (2006.01)

(52) U.S. Cl.
 CPC ........... *G21C 15/18* (2013.01); *F28D 20/003* (2013.01); *G21C 15/26* (2013.01); *G21C 15/28* (2013.01)

(58) Field of Classification Search
 CPC ........ G21C 1/022; G21C 15/18; G21C 15/26; F28D 7/06; F28D 20/003
 USPC ........................................ 376/282, 284, 299
 See application file for complete search history.

(56) References Cited

U.S. PATENT DOCUMENTS

| | | | | |
|---|---|---|---|---|
| 2,748,062 A | * | 5/1956 | Doumani | B01J 23/88 502/218 |
| 2,871,200 A | * | 1/1959 | Doumani | B01J 27/0515 502/218 |
| 3,070,535 A | * | 12/1962 | Spooner | G21C 11/08 376/287 |
| 3,158,546 A | * | 11/1964 | Cordova | G21C 9/00 376/293 |
| 3,423,286 A | * | 1/1969 | Weems | G21C 1/322 376/284 |
| 3,450,514 A | * | 6/1969 | Sinfelt | C07C 9/04 48/214 A |
| 3,450,638 A | * | 6/1969 | Edwards | C01B 6/00 149/36 |

(Continued)

FOREIGN PATENT DOCUMENTS

WO   WO-2016015475 A1 * 2/2016 ............. G21C 15/18

OTHER PUBLICATIONS

Vijayan, "Safety features in nuclear power plants to eliminate the need of emergency planning in public domain", Sadhana 38, No. 5 (2013): 925-943. (Year: 2013).*

(Continued)

*Primary Examiner* — Jack W Keith
*Assistant Examiner* — Daniel Wasil
(74) *Attorney, Agent, or Firm* — James L. Sonntag

(57) ABSTRACT

System for emergency cooling of a nuclear reactor. The system uses passive convection cooling and endothermic reactant cooling.

7 Claims, 2 Drawing Sheets

(56) References Cited

U.S. PATENT DOCUMENTS

| | | | | |
|---|---|---|---|---|
| 2012/0273714 A1* | 11/2012 | Guo | .................. | C09K 5/18 |
| | | | | 252/76 |
| 2015/0064104 A1* | 3/2015 | Huddleston | .............. | C01B 3/04 |
| | | | | 423/648.1 |
| 2015/0376002 A1* | 12/2015 | Wallace | ................. | C01B 3/501 |
| | | | | 423/657 |
| 2016/0158760 A1* | 6/2016 | Wright | ................. | B01L 3/5027 |
| | | | | 435/287.2 |

OTHER PUBLICATIONS

Hada, "Design of a Steam Reforming System to be Connected to the HTTR", 1996, JAERI-CONF—96-010. (Year: 1996).*

* cited by examiner

EMERGENCY HEAT REMOVAL IN A LIGHT WATER NUCLEAR REACTOR BY USING A PASSIVE ENDOTHERMIC REACTION COOLING SYSTEM

CROSS REFERENCE TO RELATED APPLICATIONS

This is a continuation-in-part of U.S. patent application Ser. No. 16/162,815, filed Oct. 17, 2018, which claims priority from International Patent Application under the PCT PCT/US17/28345, filed Apr. 19, 2017, which claims priority from U.S. Provisional Patent Application 62/324,715, filed Apr. 19, 2016, all of which are hereby incorporated by reference.

BACKGROUND

The primary challenge of nuclear power utilization is the potential for severe consequences from nuclear accidents. Developing systems that will remove decay heat from a reactor passively, or without electricity or operator action, during an accident can help prevent a fuel meltdown. This would prevent radioactive particles from contaminating the environment and public at large. The value of such passive safety systems was demonstrated at Fukushima in March 2011 when a large earthquake eliminated normal electrical power to the nuclear power plants, and the subsequent Tsunami eliminated the backup power systems. The resulting accidents were a direct result of the absence of an adequate passive path for the removal of the decay heat.

GEN III+ plants provide passive decay heat removal using natural circulation and boiling water as the ultimate heat sink of the passive safety systems, but this process is limited to 3.5 days for large (l00OMWe) reactors and 7 days for small reactors (<300 MWc). Additionally, these systems still require valve actuation, and in some cases operator action in order to start or maintain operation. Finally, these systems often dump radioactive water in various parts of the power plant, rendering the plant inoperable and uninhabitable, and considerable capital investment is lost by the owner of the plant.

Prior art follows two general branches. The first includes various passive cooling systems for Light Water Reactors (LWRs), which utilize the latent heat of boiling water and natural convection circulation systems. There are other systems using fluids with higher latent heats, and some that include the melting of solids or enhancing natural circulation fluids.

The second branch includes general cooling systems that use endothermic reactions. These include cooling of food products, hypersonic jet fuel, and chemical reactors. An additional patent is referenced which proposes cooling nuclear cores by including endothermic reaction materials directly into a nuclear core.

SUMMARY

The present system provides a completely passive means that can provide more than a month of cooling to a light water reactor in a severe accident like that which occurred at the Fukushima nuclear power stations.

The present system eliminates the need for actuation and operator action, and extends the period of passive cooling from 3.5-7 days to any selected period, such as 30 days, thus greatly extending the window of opportunity for providing external cooling capabilities to the nuclear power plant prior to a fuel melt-down. Additionally, since no dumping or external boiling of radioactive water is required, capital asset preservation is attained for the plant owners.

As described above, most endothermic reaction cooling is proposed for applications other than nuclear power plants. The primary difference between the present system and these prior cooling systems is the application to large scale emergency cooling needs of a nuclear power plant during an accident.

In U.S. Pat. No. 3,198,710, issued Aug. 3, 1965, cooling a nuclear core via an endothermic reaction was proposed. However, this patent proposes using an endothermic reaction inserted directly into the nuclear core. This is infeasible due to strict licensing requirements, and stringent fuel fabrication standards. In essence, the purpose is to provide very high temperature (about 1300 degrees C.) thermal shielding to the balance of the plant and critical components rather than to provide long-term cooling to the nuclear power plant system.

In the prior art relating to nuclear reactor fuel using endothermic reactions, few if any are capable of providing cooling to existing LWRs. The temperature range of the reaction is far above safe accident temperature ranges in a light water reactor, and a new and unconventional fuel is required to be used in the reactor. These restrictions are not easily utilized in current nuclear plants. Additionally these systems cannot provide cooling for 30 days or more, or they do not protect the capital asset of the plant. Although they protect the public, they do not protect the investment of the utility that owns and operates the plant. Finally, some proposed solutions may potentially meet these requirements, but they cannot be licensed under the current licensing framework.

The system described here is easily included in currently operating light water reactor nuclear power plants, and has the potential to provide long term cooling (30 days or more) with a relatively small tank of reactants. Additionally, because no reactants or products will be irradiated and released to the containment or other reactor areas, asset preservation is achieved. The products of the endothermic reaction are valuable resources, and could be sold to offset the cost of a replacement system in the event of a nuclear accident, which further enhances the economics argument of utilizing the current system.

The present system can be retrofitted to nuclear power plants currently operated in the United States. This system can provided emergency core and containment cooling for up to 30 days, or more, with no need for process control, electrical input, operator action, or mechanical actuation. This cooling is provided via a tank filled with one or more chemicals that undergo an endothermic chemical reaction when a certain activation temperature is achieved. This endothermic reaction, once initiated, absorbs the decay heat generated by the nuclear core. Because the reaction will slow/stop when the temperature falls below the activation temperature no additional heat is provided, there is no need for initiation or termination of the process. The endothermic reaction will automatically begin cooling the nuclear reactor when elevated temperatures are present, and will stop when excess temperatures are no longer present. Accordingly, the Passive Endothermic Reaction Cooling System (PERCS) system prevents the temperature from exceeding a design maximum emergency temperature, above which significant damage to the reactor, release of radioactivity, or other undesired, catastrophic, or dangerous event might occur.

There are at least three aspects where this system can be utilized, (1) passive containment cooling, (2) and passive core cooling, and (3) passive cooling of the spent reactor.

In the containment cooling aspect, a large PERCS tank containing one or more reactants is placed within the containment. This tank (for example, roughly 30 ft (10 meters) diameter by 30 ft (10 meters) height) is located either at ground level, or at an elevated level in the containment. At any point, if temperatures above the activation temperature exist, the one or more reactants, which can be in a solid, powdered state, melt at slightly elevated temperatures. Once in liquid form, the endothermic reaction beings to proceed based upon the rate at which heat is transferred from the containment in the form of steam or hot air to the reactants. Alternately, the reactant or reactants can endothermically decompose at elevated temperature. This serves to provide a "heat sink" for the containment building, so that a heat transfer pathway through the concrete containment walls is not needed. As temperatures increase, heat transfer into the endothermic reaction tank is increased, the reaction speed is increased, and the rate of heat removal is increased. As the temperatures decrease, this reaction rate is similarly decreased, ensuring control of the system without any need for operator action. Also, there is no need for manual actuation of valves or flow paths, since no heat will be removed until after the activation temperature (for example, about 100° C.) is reached.

The second application, which is more difficult to retrofit to current LWRs, requires the attachment of a PERCS tank with one or more reactants (different from the tank of the first application) to a cooling line that directly feeds the nuclear core. In the event of a nuclear accident, core temperatures will reach about 1000° C., and water from the primary cooling system will begin to flow via natural circulation to a heat exchanger in the reactant tank. This water will be cooled by the endothermic reaction that initiates at, for example, 600° C., and in a similar way to the first application, heat will be removed from the circulating water. This tank has a reaction system that has higher reaction energies, and thus can be smaller and more space efficient. It serves the same purpose as the ultimate heat sink tanks found on small modular reactors. The difference is that the duration of cooling can be for significantly longer periods, such as 31 days rather than 7 days for a similarly sized tank.

Third a self-contained PERCS tank of reactants can be inserted into the spent fuel pool. Operating in a similar manner as a containment cooling tank, except that fluid in the reactant tank is water rather that air, and cooling is achieved by convective circulation of the water. The reactant tank can moderate the temperature of the spent fuel pool, with an activation energy at around 50° C., to prevent boiling and subsequent loss of pool water in the case of a severe accident.

DETAILED DESCRIPTION

The present system has at least two broad applications and thus customer groups:

(1) It can be incorporated into future Light Water Reactor (LWR) nuclear power plants as a means of removing decay heat in case of a catastrophic event or severe accident. It can supplant more expensive systems while providing a similar cost, thus decreasing the capital investment of these new nuclear power plants.

(2) It can be retrofitted to existing and currently operating nuclear power to plants in order to provide emergency passive cooling to these plants. The present system is significantly cheaper and more reliable than alternative methods for increasing safety of these plants in the case of catastrophic events (known as the FLEX systems).

Due to the preservation of capital assets, low cost of the unit, and ease of installation and maintenance, even to existing nuclear power plants, the primary potential customers would be nuclear plant vendors (such as Westinghouse Electric Company or AREVA) plant owners, and utilities that operate nuclear plants (such as Southern Company and Exelon).

An aspect of the present system is a large tank, or like container, containing a reaction system of one or more chemical reactants that can be stored within the containment of a currently operating nuclear power plant. These reactants are inert or non-reactive at operating temperatures and pressures. However, upon reaching a certain elevated temperature (activation temperature), the reactant system reacts. This can involve a solid decomposition and it may be accompanied by a phase change, such as melting. The reaction is specifically an endothermic reaction, which means that it requires heat in order to proceed. Without heat the temperature will drop below the activation temperature and the reaction will essentially stop. The net effect is that as temperature in the tank is increased, the rate of reaction, and thus the rate of heat absorption, is also increased. As the temperature decreases, the rate of reaction (and thus head absorption) decreases. In this way, a cooling system initiated and regulated passively is possible using two chemical reactants.

Figure 1:
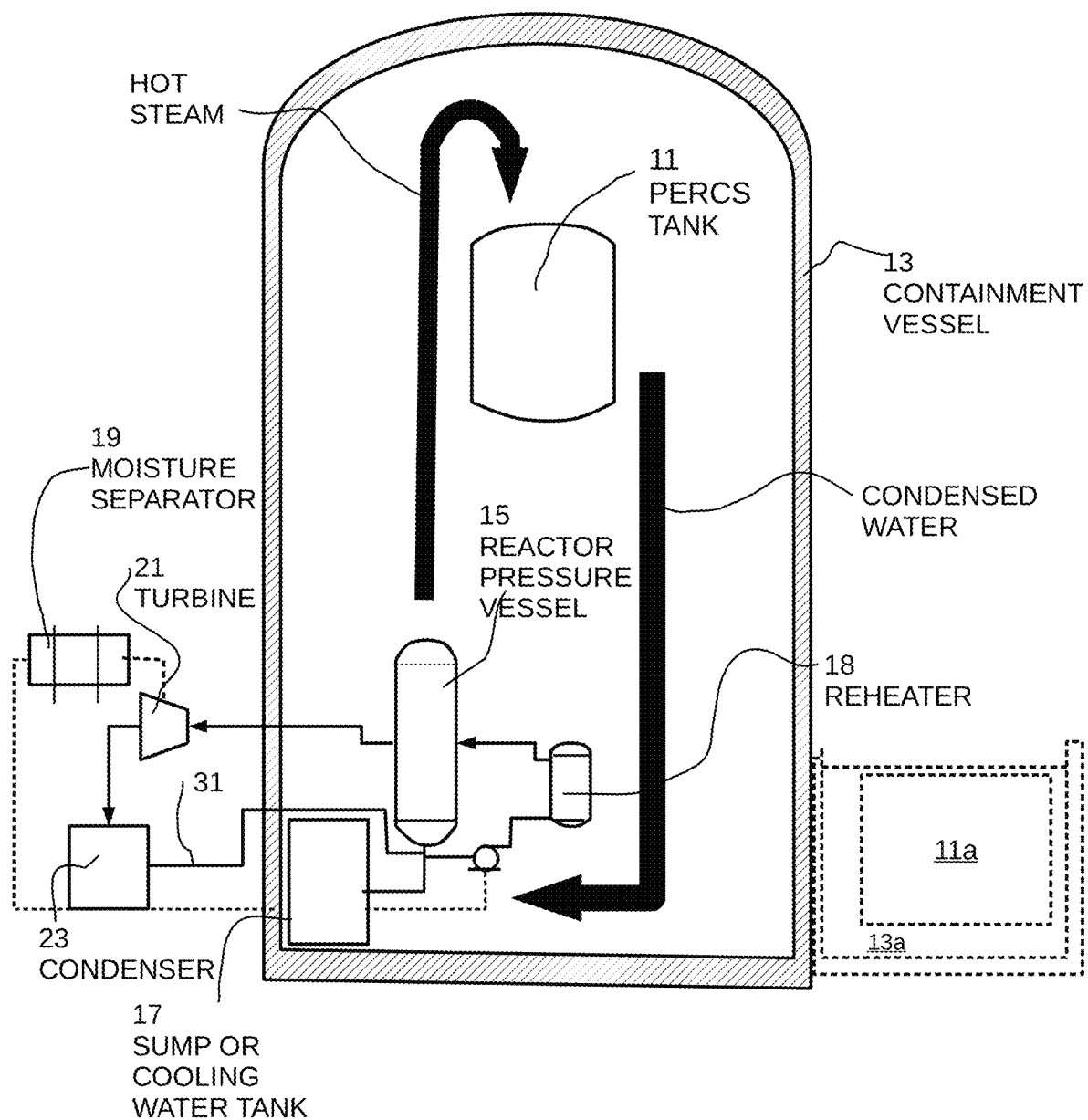
FIG. 1 is a schematic showing an exemplary arrangement of a PERCS tank in a nuclear reactor containment vessel for containment cooling.

One aspect of the present system is illustrated in FIG. 1. Illustrated is a nuclear power system comprising a moisture separator 19, turbine 21, and a condenser 23, and a containment vessel 13, within which is reactor pressure vessel 15, sump or cooling water tank 17, and reheater. 18. These components are connected by a primary water system 31, which includes pipes or lines connecting the components as shown.

In this system, a tank of reactants (PERCS Tank) 11 is located at an elevated position in the nuclear containment vessel 13. In an accident or emergency, steam is released into the containment 13, such as in the case of an intentional venting of the primary coolant system, or a leak in the primary system (known as a loss of coolant accident, or (LOCA). This release of steam rises and raises the ambient temperature of the nuclear containment. As the steam rises to the top of the containment, it comes in contact with and subsequently heats the PERCS tank, and the chemicals in the tank. Once the activation temperature of the chemical reactions is reached in the tank (around 60"C) then the chemical reactions initiate without the need for valve actuation or electrical power. The steam will condense on the reaction tank (which is actively absorbing heat at this point) and then it drips back down into the containment, where it can be directed into the reactor sump or cooling water tank. This water can then be re-injected into the containment vessel in order to prevent core uncover and meltdown of the fuel. This process can last for at 35 days compared to the 3 days of current containment cooling systems. Also illustrated by the phantom lines is a PERCS tank 11a external to the containment in a cooling pool 13a.

Figure 2:
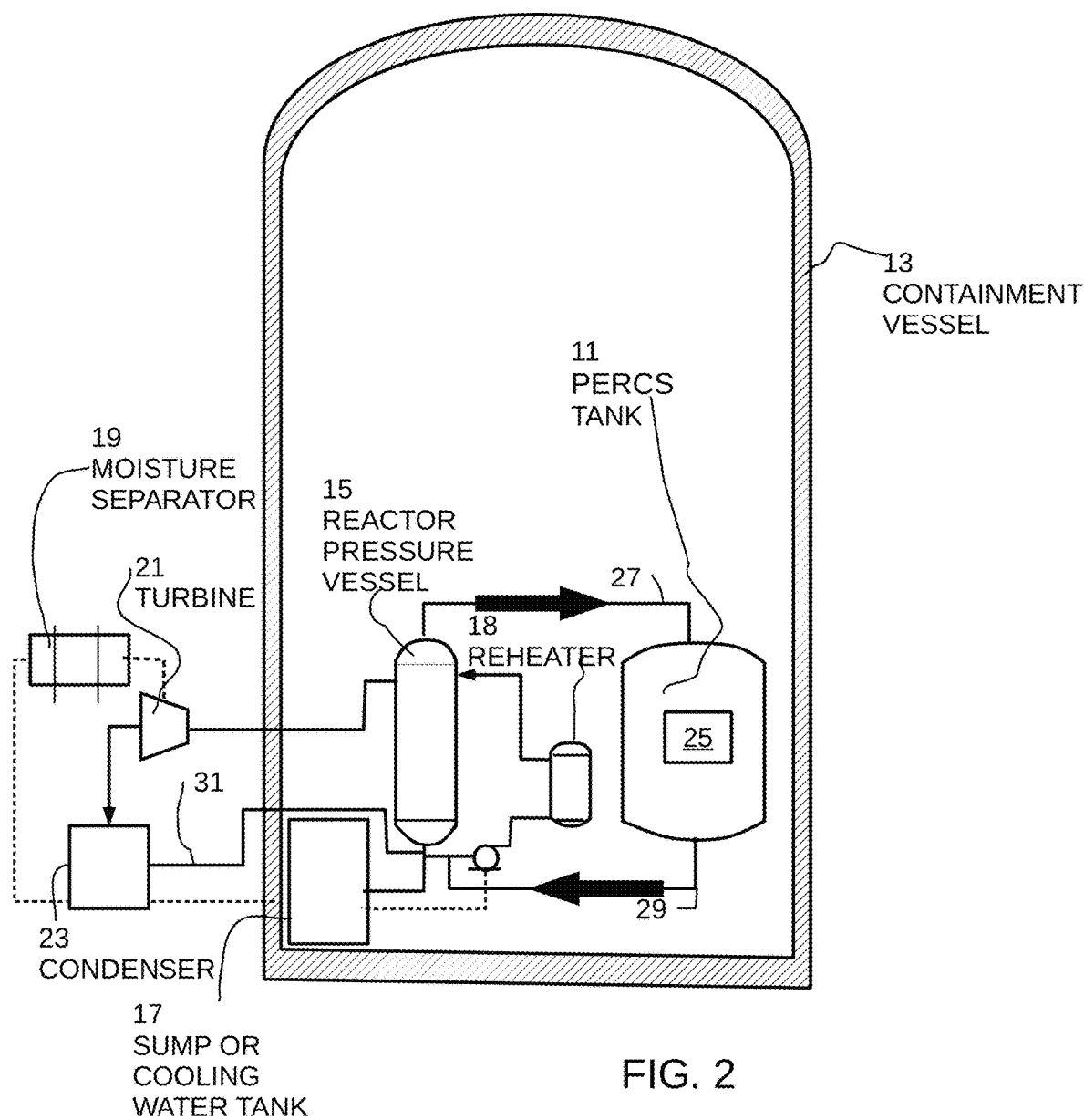
FIG. 2 is a schematic showing an exemplary arrangement of the PERCS tank in a nuclear reactor containment vessel for reactor vessel cooling.

The second aspect is illustrated by FIG. 2, where elements corresponding to those in FIG. 1 are labeled with the same reference number. This aspect is similar to that of FIG. 1, but the PERCS tank 11 now contains a heat exchanger 25 that is thermally coupled to a water pipe 27 that is directly connected to the primary water system. In this case, a different chemical reaction is utilized, which has a significantly higher initiation or activation temperature (about 600° C.). This system will be at a temperature of about 350° C. during standard operation, and no flow will be traveling between the reactor and PERCS system, since the temperature in both will be the same. However, in the case of a nuclear accident, the core will heat up, and water will rise via natural circulation via the upper line 27 into the PERCS tank heat exchanger 25. This water will then transfer heat into the PERCS system, cooling down and dropping back into the via line 29 core, initiating a natural circulation loop. Once the inside of the PERCS tank 11 heats to over the 600 degree C. initiation temperature, a chemical reaction initiates, and heat is absorbed from the primary system water. Thus, an elevated heat sink and the heat provided by the core develop a natural circulation loop in which heat is removed naturally from the core via the endothermic reaction taking place in the PERCS tank. In essence this PERCS tank serves the same function as the ultimate heat sink in current nuclear power plant design, but providing a longer term heat sink for the decay heat generated by the nuclear core. Thus, direct and immediate cooling can be provided to the core, even if no steam is vented to the containment.

Alternate constructions are contemplated, such as a PERCS either within or without the containment for either aspect. Having the PERCS tank outside the containment may be desired in a retrofit or to supplement cooling systems inside of the containment.

The systems illustrated above show that the present system can have three key advantages that makes the present system attractive:

(1) There is no need for valve actuation, electrical power, or operator action to start the cooling process. Additionally, there is no likelihood of inadvertent actuation, since the reactions won't begin unless elevated temperatures are experienced.

(2) This cooling system can last until convective air cooling or other systems can be used, which can be up to 35 days or longer, which is 5 times longer than the time a water-based passive cooling system will last. This provides substantial time to recover the reactor in case of a catastrophic natural disaster causing a plant shutdown.

(3) The cooling for this system is self-regulating, i.e. as temperature rises the endothermic reaction proceeds more quickly, increasing the rate at which heat is removed, while the reaction proceeds more slowly if temperature drops. Thus, sophisticated process control systems are not needed for this PERCS method of cooling. Additionally, inadvertent cooling accidents are no longer a feasible path to failure for operating systems.

Any endothermic reaction system of one or more reactants that meets the required activation temperature and other design criteria is contemplated. A wide range of chemical reactions have been considered for this system, and around 10 chemical reactions have been found that meet the criteria of heat removal capability, activation temperature, corrosivity and toxicity of the chemical reactants and products, and heat transfer capabilities. It is also desirable that the reaction system not produce reaction products that might materially interfere with continuation of the reaction, such as, for example, by a solid or liquid forming layer or film over reaction sites.

Endothermic reactions occur when the energy of the products is higher than that of the reactants. This reaction will proceed once an activation energy (typically associated with an ambient temperature) is achieved. As the reaction proceeds, if at any point the activation energy is not achieved, then the reaction will slow and cease. Thus, these reactions required substantial energy to proceed, and will not be spontaneous unless sufficient heat is supplied to the reactants. In this way, these endothermic reactions are suitable in the present system for nuclear safety and cooling applications; they require no operator action to initiate, they will proceed only as needed in terms of overheating the core, and they will not spuriously occur (causing "overcooling" transients in a reactor).

A passive cooling system for the containment and core is accomplished through a tank containing reactants at ambient temperature and pressure. In the event of an accident where cooling capabilities are lost, the primary cooling system will begin to heat up. A heat exchange system, which thermally connects the core or containment to the passive endothermic reactor cooling system (PERCS) is used to to transfer energy from the core to the cooling system. Once the core begins overheating, the temperature increases in the cooling system and reaches an activation temperature, which initiates the endothermic reaction.

Activation is where there is a material increase in the reaction rate of the endothermic reaction or reactions, where at below the activation temperature, the reactants are stable, and reaction is negligible, to a reaction rate where it is sufficient to cause the endothermic cooling effect described above. In addition to heating to provide sufficient activation energy, the mechanism of activation of the reaction may depend upon the particular reaction system selected, and the increase of the reaction rate may involve melting of the reactants which may speeds up reaction, mixes reactants and promotes reactant contact, which may also involve mixing of two or more reactants. Other mechanisms involving reactant vaporization, use of a non-reactive melting or vaporizing phase, liquid or solid solution of reactants and/or non-reactants, liquid-solid reaction systems, vapor-solid-phase reaction systems, solid reaction systems involving endothermic disintegration into a gas, liquid or solid, Activation may involve any one or more the above, and may include phase and/or chemical transformation. In one aspect of the present system, melting solids are arranged in the containment tank such that melting occurs asymmetrically in each reactant, leading to mixing prior to reaction initiation.

In addition, there may be mechanical structures in the PERCS tank configured and dimensioned to promote reaction. Passive mixing is believed to be sufficient, but in certain applications active mixing may be provided. The reactants may be in suitable form, as, for example, a solid in a powder or tablet, or a liquid, a solid-liquid suspension, a liquid-liquid emulsion, a solid or liquid solution, or the like. The reaction system may also involve water or steam as a reactant, and involves its increase in reactivity (concentration and temperature) by the emergency or accident conditions. It is contemplated that the reactant to system contain one or several reactants, and may involve one endothermic reaction, successive endothermic reaction, and endothermic reactions occurring independent with different reactant chemical and products. The reaction system may also include non-reactive chemical components, such as solvents, modifiers, and the like, to adjust melting or vaporizing temperature, physical properties, and the like.

The PERCS tank is constructed to be in thermal communication where cooling is to be applied (for example, air in containment, primary cooling fluid, fluid in the spent reactor pool). The contact is such that upon a temperature fluctuation a convective circulation spontaneously arises transferring heat to or from the reaction system. This can be provided by any suitable means, including one or more, and not limited to, heat exchanges, fluid conduits/pipes, thermal transfer surface (e.g. fins), that are disposed to provide the necessary convective flow. For containment and reactor pool application, the PERCS tank may be placed to be surrounded by the containment air or pool water. For a reactor core cooling application, a possible construction is a pipe bypass in the primary cooling system that passes through heat exchanger in a PERCS tank, where the convective flow is encouraged through the bypass by an elevational change.

The volume and the amount of reactants required for decay heat removal is determined by the amount of time the system is designed to function, which may be any amount to time, but usually about 1 month or longer. For practical reasons, the volume of reactant PERCS tank should be smaller than that of water required to removal the same amount of decay heat, or 13200 m³. A phase change material in the reactant system is desirable for the latent heat involved. This also means that the reactants can begin in a high-density phase, preferably a solid, so as to pack in as much heat absorbing material in the smallest space possible.

Thermodynamically, thermal decomposition does not always occur at the rate the decay heat is produced. Finding reactions with kinetic data that mimic the decay heat curve ensures that the core can be cooled over the course of 31 days. 31-days is an important benchmark because after this period the core usually can be successfully air-cooled.

As the purpose of the system is to enhance reactor safety, it is necessary to consider the safety of the system. Reactant systems that do not present a significant toxic or flammability hazard are suitable.

The purpose of suitable endothermic reactions is to cool nuclear reactors by providing a reaction that initiates passively above a suitable activation temperature and where the reaction can provide cooling. Ideally, no mechanical actuation, electrical input, or operator action is required. The reaction activates only when melting temperatures of the reactants are reached and the activation energy barrier is overcome.

In Table 1, are shown reactant systems that are believed to be suitable. Other systems that meet the proper design criteria are also contemplated. For reference, the water phase change (boiling) heat removal capacity, which represents the currently employed method for passive heat removal for Gen III+ reactors, is also listed. Note that using $NiSO_4$ dissociation reaction in a PERCS presents an improvement in heat removal capacity by a factor of 4.

TABLE 1

Reactant and heat removal capacity

| Reactant | Heat removed (GJ/m³) |
|---|---|
| $NiSO_4$ | 10.59 |
| $CoSO_4$ | 5.617 |
| $MgCO_3$ | 5.784 |
| $CuSO_4$ | 5.626 |
| $MnCO_3$ | 4.891 |
| $NH_4F$ | 4.686 |
| $MgH_2$ | 4.672 |
| $NaBH_4$ | 4.630 |
| $NH_4HCO_3$ | 3.363 |
| Boiling Water | 2.497 |

$NH_4[H_2NCOO]$ Ammonium Carbamate reacts as follows, $$NH_4[H_2NCOO] \rightarrow CO_2 + 2NH_3$$

It is an endothermic decomposition reaction with decomposition of ammonium carbamate occurring between 10-60° C. At 100 kPa (14.5 psi) ammonium carbamate decomposes at 60° C. At 10 kPa (1.45 psi), it decomposes at 20° C. To decompose at about 42° C., pressure would need to be about 40 kPa (5.8 psi).

Decomposition will occur faster with ammonium carbamate dissolved in or mixed with ethylene glycol or propylene glycol. This combination substantially increases the thermal conductivity of the mixture. One such example would be a concentration of 0.37 g/ml of ammonium carbamate in ethylene glycol or propylene glycol.

$NiSO_4$ decomposes gradually from 400 to 840° C. (Ref. 8). NiSO4 is a solid at room temperature, and will eventually melt at 100° C. Once melted, heat is absorbed until decomposition begins at 400° C. until decomposition is completed around 840° C. The heat of reaction of mechanism (5) is 336 kJ/mol according to the above equation, and a cylinder tank filled with solid chemical 10 meters high will be 19.65 meters in diameter, 20.75 meters smaller than a tank of water with the same heat absorbed.

$$NiSO_4(s) \rightarrow NiO(s) + SO_2(g) + 0.5O_2(g) \quad (6)$$

Solid $CoSO_4$ melts at 735 and begins decomposition to around 770° C. (Ref. 9). The heat of reaction from this path is 209 kJ/mol.

$$CoSO_4(S) \rightarrow CoO(s) + SO_3(g) \quad (7)$$

Decomposition of $MgCO_3$ begins around 350° C. and continues past 500° C. from a solid to a solid and gaseous product.[9] The theoretical heat of reaction is 128.33 kJ/mol.

$$MgCO_3(s) \rightarrow MgO(s) + CO_2(g) \quad (8)$$

$CuSO_4$ decomposes from 550° C. to 700° C. according to mechanism (8). The theoretical heat of reaction is 160 kJ/mol with a melting temperature of 216° C., far below the decomposition temperature.[11]

$$CuSO_4(s) \rightarrow CuO(s) + SO_3(g) \quad (9)$$

$MnCO_3$ decomposition occurs from temperatures of 200 degrees C. with the highest yield occurring at around 400° C. This decomposition does not occur in one step, but instead generally follows a two-step process in which $MnCO_3$ is converted to $Mn_3O_4$ with CO and $CO_2$, and then the $Mn_3O_4$ reacts with CO to form MnO and $CO_2$, which is the most thermodynamically favorable result.[12]

$$MnCO_3(s) \rightarrow MnO(s) + CO_2(s) \quad (10)$$

$NH_4F$ decomposes in a single step via the following mechanism.[13] At 100° C. melting begins concurrently with while decomposition begins, which has been documented to continue until 230° C.[14] The heat of reaction of this mechanism is 145 kJ/mol.

$$NH_4F(s) \rightarrow NH_3(g) + HF(g) \quad (11)$$

MgH$_2$ decomposes to elemental magnesium and hydrogen gas via the below reaction. Depending on the metal catalyst used and other combinations with the MgH2, decomposition occurs most rapidly at temperatures between 300-450° C. The calculated heat of reaction for this mechanism is 75.31 kJ/mol.

$$MgH_2(s) \rightarrow Mg(s) + H_2(g) \quad (12)$$

Decomposition of NaBH$_4$ beginning around 500° C. can follow several pathways, with this pathway having a heat of reaction of 135 kJ/mol. Experimentally however the heat of reaction is much higher, ranging from 193.643 kJ/mol to 245.5 kJ/mol, depending on the pathway the reaction took.[16]

$$NaBH_4 \rightarrow NaH + B + H_2 \quad (13)$$

$$NaH \rightarrow Na + 0.5*H_2 \quad (14)$$

Decomposition of NH$_4$HCO$_3$ begins at relatively low temperatures of 40-60° C., and decomposes with a couple pathways. One goes to NH$_3$ and H$_2$CO$_3$, whereas the reaction calculated here more completely decomposes the H$_2$CO$_3$ to H$_2$O and CO$_2$. Studies have shown that the decomposition to each product hits its peak at different temperatures, with an overall maximum around 120-140° C.[17] For the overall pathway, the calculated heat of reaction is 127.23 kJ/mol.

$$NH_4HCO_3 \rightarrow NH_3 + H_2O + CO_2 \quad (15)$$

Example I

One example of a suitable reaction for use in: the PERCS containment cooling (FIG. 1) is the decomposition of nickel (II) Sulfate (IV) hexahydrate, which takes place in 4 separate reactions each occurring at different temperatures starting at 70 degrees C.

$$NiSO_4 \cdot 6H_2O \xrightarrow{\Delta} NiSO_4 \cdot 2H_2O_{(s)} + 4H_2O_{(g)} \quad \text{I}$$

$$NiSO_4 \cdot 2H_2O_{(s)} \xrightarrow{\Delta} NiSO_4 \cdot H_2O_{(s)} + H_2O_{(g)} \quad \text{II}$$

$$NiSO_4 \cdot H_2O_{(s)} \xrightarrow{\Delta} NiSO_{4(s)} + H_2O_{(g)} \quad \text{III}$$

$$NiSO_{4(s)} \xrightarrow{\Delta} NiO_{(s)} + SO_{2(g)} + \frac{1}{2}O_{2(g)} \quad \text{IV}$$

This reactant is advantageous because only one reactant is needed, no toxic or reactive chemical species are created in the process, and water generated in the reactions can be used to provide further cooling to the nuclear system.

Example II

A suitable reaction is being considered for the direct or primary cooling system (FIG. 2) which has an activation temperature of around 600 degrees C. This involves a reaction system of MgCO$_3$.

Thus in summary, the present system consists of the development of a new, long-term, high-capacity heat sink that can be retrofitted to current nuclear power plants. This heat sink, called the passive endothermic reaction cooling system, or PERCS, can be used for containment and primary system cooling, does not need to be actuated by valves, operators, or electrical power, operates on completely passive principles, and cannot be inadvertently actuated during normal operating conditions. It is significantly cheaper than the current mitigation techniques mandated by the nuclear regulatory commission.

The present system can be incorporated to either pressurized water reactors or boiling water reactors, either as a modification to existing reactors, or to newly built reactors. It can also be used in combination with some current mitigation systems, for example, as an independent mitigation operating in parallel to the other system.

An example of a reactor for which the present system is well suited, because of its simplicity of construction, and ease to scale it to any size reaction is disclosed in United States Patent Applications US 20130336440 to Memmott, et al., and US 20130336441, to Cronje, et al., which describe modular reactor designs to which the present system can be applied.

The present system can be applied to systems using external passive core cooling in advanced light water reactor concepts, such as the Westinghouse's AP1000® reactor. In that concept there are numerous tanks of water such as the IRWST, The Core Makeup Tank, and the Pressure Suppression Pool that serve to ultimately remove decay heat from the core. The present PERCS system has a similar design function, except that the water is replaced with endothermic reaction reagents that when reacting have a higher thermal inertia than water alone. As with other passive safety systems, at the onset of an accident sequence, primary system water flows through the core and heats beyond standard operation temperatures. This liquid then flows into a heat exchanger in the PERCS tank where the energy is provided to the chemical reactants. This cools the primary coolant, which then reenters the core to extract additional decay heat. This variant of the present PERCS system can only be used, however, in reactors with emergency coolant pipes running through the primary system.

Any nuclear reactor design has regions, and sections that may require cooling in emergency conditions. The present PERCS system may be applied to these systems by thermally coupling the PERCS tank as illustrated above, by use of any suitable means, including one or more and not limited to, piping, conduits, heat exchangers, bypass convective flow conduits, separate closed convective heat exchange loops, and the like. In addition to the water cooled system illustrated, the present PERCS system may be applied to, for example, liquid metal cooled system, gas cooled systems, and to any component as appropriate. The present PERCS system may be applied as part of an existing emergency cooling system, as independent working parallel to supplement an existing system, or to replace an existing system.

While this has been described with reference to certain specific embodiments and examples, it will be recognized by those skilled in the art that many variations are possible without departing from the scope and spirit of the invention as described by the claims, and it is intended to cover all changes and modifications which do not depart from the spirit of the invention.

What is claimed is:

1. A method for emergency cooling of a nuclear reactor system comprising
thermally communicating heat from a fluid in the nuclear reactor system to a contained endothermic chemical reaction system having at least one chemical reactant, the endothermic chemical reaction system is contained within a heat sink tank disposed within an interior area of a containment of the nuclear reactor system, the tank is configured to
prevent release of the at least one of chemical reactant therefrom into the containment and
prevent reaction products resulting therein from being released therefrom into the containment,
the thermal communication comprising a passive convective flowing of the fluid around walls of the tank that transfers heat between the endothermic chemical reaction system and the fluid when there is a predetermined temperature differential between the fluid and the endothermic chemical reaction system,
such that temperature of the endothermic reaction system is responsive to temperature of the fluid and the nuclear reactor system,
the at least one chemical reactant in the endothermic chemical reaction system having a chemical activation temperature at which endothermic chemical reaction initiates,
the chemical activation temperature of being a value
above the temperature of the endothermic chemical reaction system when the nuclear reactor system is at operating temperature and below the temperature of the endothermic chemical reaction system when the nuclear reactor system is at maximum emergency temperature.

2. The method according to claim 1 wherein the fluid includes one of or more from the group of air, water and steam.

3. The method according to claim 1 wherein the heat sink tank contains a heat exchanger.

4. The method according to claim 1 wherein the nuclear reactor system is a water cooled system.

5. The method according to claim 1 wherein the at least one chemical reactant includes $NH_4[H_2NCOO]$, that endothermically reacts as $NH_4[H_2NCOO] \rightarrow CO_2 + 2NH_3$.

6. The method according to claim 1, wherein the endothermic chemical reactant system comprises one or more chemical components from $NiSO_4$, $CoSO_4$, $MgCO_3$, $CuSO_4$, $MnCO_3$, $NH_4F$, $MgH_2$, $NaBH_4$, $NH_4HCO_3$, and $NH_4[H_2NCOO]$.

7. The method according to claim 1, wherein the endothermic reactant system includes one or more of the $$NiSO_4 \cdot 6H_2O \xrightarrow{\Delta} NiSO_4 \cdot 2H_2O_{(s)} + 4H_2O_{(g)} \qquad \text{I}$$

$$NiSO_4 \cdot 2H_2O_{(s)} \xrightarrow{\Delta} NiSO_4 \cdot H_2O_{(s)} + H_2O_{(g)} \qquad \text{II}$$

$$NiSO_4 \cdot H_2O_{(s)} \xrightarrow{\Delta} NiSO_{4(s)} + H_2O_{(g)} \qquad \text{III}$$

$$NiSO_{4(s)} \xrightarrow{\Delta} NiO_{(s)} + SO_{2(g)} + \frac{1}{2}O_{2(g)}. \qquad \text{IV}$$

* * * * *